United States Patent
Ono et al.

(10) Patent No.: US 11,752,998 B2
(45) Date of Patent: Sep. 12, 2023

(54) VEHICLE CONTROL DEVICE, METHOD, PROGRAM, AND VEHICLE

(71) Applicant: TOYOTA JIDOSHA KABUSHIKI KAISHA, Toyota (JP)

(72) Inventors: Toru Ono, Toyota (JP); Yasushi Kusaka, Toyota (JP); Toshihiro Kawai, Ozakai (JP); Shinichi Inoue, Ozakai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 190 days.

(21) Appl. No.: 17/339,544

(22) Filed: Jun. 4, 2021

(65) Prior Publication Data

US 2021/0402979 A1    Dec. 30, 2021

(30) Foreign Application Priority Data

Jun. 30, 2020 (JP) ................................ 2020-113423

(51) Int. Cl.
*B60W 20/20*    (2016.01)
*B60W 20/40*    (2016.01)
*B60L 58/18*    (2019.01)

(52) U.S. Cl.
CPC ............. *B60W 20/20* (2013.01); *B60L 58/18* (2019.02); *B60W 20/40* (2013.01)

(58) Field of Classification Search
CPC ....... B60W 20/20; B60W 20/40; B60L 58/18; B60L 2240/80; B60L 2250/12; B60L 2250/16; B60L 58/20; B60L 1/00; Y02T 10/70; B60R 16/033
USPC .......................................................... 701/22
See application file for complete search history.

(56) References Cited

U.S. PATENT DOCUMENTS

2010/0001523 A1*  1/2010  Sato ...................... B60L 3/0046
                                                                290/31
2019/0359079 A1*  11/2019  Mitsutani ................ H02J 1/082

FOREIGN PATENT DOCUMENTS

CN    107244244 A    10/2017
JP    2007-189760 A   7/2007
JP    2019-205275 A   11/2019

* cited by examiner

*Primary Examiner* — Yi-Kai Wang
(74) *Attorney, Agent, or Firm* — Oliff PLC (57) ABSTRACT

A vehicle control device mounted on a vehicle includes: an operation detection unit that detects an operation performed on the vehicle by a user; a power supply control unit that controls execution of power supply from a first battery involved in vehicle traveling to an auxiliary load powered by a second battery that is different from the first battery, with a start switch of the vehicle being off; and a prohibition control unit that prohibits the power supply to the auxiliary load by the power supply control unit, in response to the operation of the user detected by the operation detection unit.

8 Claims, 8 Drawing Sheets

VEHICLE CONTROL DEVICE, METHOD, PROGRAM, AND VEHICLE

CROSS-REFERENCE TO RELATED APPLICATION

This application claims priority to Japanese Patent Application No. 2020-113423 filed on Jun. 30, 2020, incorporated herein by reference in its entirety.

BACKGROUND

1. Technical Field

The present disclosure relates to a vehicle control device mounted on a vehicle, and the like.

2. Description of Related Art

Japanese Unexamined Patent Application Publication No. 2019-205275 (JP 2019-205275 A) discloses a technique for optimizing a vehicle power source in a vehicle including, as vehicle power sources, a high-voltage battery and a low-voltage battery. The high-voltage battery supplies electric power to a vehicle device referred to as a main device such as an electric motor. The low-voltage battery supplies electric power to vehicle devices referred to as auxiliary devices such as an electronic mirror and a boarding assist device. In the device described in JP 2019-205275 A, when power consumption by the auxiliary devices is larger than a predetermined value with the vehicle start switch being off (the vehicle operation stopped), electric power is automatically supplied from the high-voltage battery to the low-voltage system (auxiliary devices, low-voltage battery, etc.). This control reduces running out of the low-voltage battery.

SUMMARY

However, in the device described in JP 2019-205275 A, for example, when the user tries to inspect the vehicle with the start switch being off, the power supply from the high-voltage battery to the low-voltage system may start immediately before the inspection. In that case, the user has to wait for the power supply to finish in order to work with peace of mind.

The present disclosure has been made in view of the above issues, and an object of the present disclosure is to provide a vehicle control device and the like capable of interrupting power supply from a high-voltage battery to a low-voltage system at a timing desired by a user.

In order to solve the above issues, an aspect of the present disclosure technology relates to a vehicle control device mounted on a vehicle. The vehicle control device includes: an operation detection unit that detects an operation performed on the vehicle by a user; a power supply control unit that controls execution of power supply from a first battery involved in vehicle traveling to an auxiliary load powered by a second battery that is different from the first battery, with a start switch of the vehicle being off; and a prohibition control unit that prohibits the power supply to the auxiliary load by the power supply control unit, in response to the operation of the user detected by the operation detection unit.

Another aspect of the present disclosure technology relates to a control method that is executed by a computer of a vehicle control device mounted on a vehicle or a control program that is executed by a computer of a vehicle control device. The control method and the control program each include: a step of detecting an operation performed on the vehicle by a user; a step of controlling execution of power supply from a first battery involved in vehicle traveling to an auxiliary load powered by a second battery that is different from the first battery, with a start switch of the vehicle being off; and a step of prohibiting the power supply to the auxiliary load in response to the detected operation of the user.

With the vehicle control device and the like of the present disclosure, it is possible to interrupt power supply from the high-voltage battery to the auxiliary load of the low-voltage system at a timing desired by the user.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle control device of the present disclosure prohibits power supply from a high-voltage battery to auxiliary loads included in a low-voltage system and lifts the prohibition when a specific operation is performed by a user, with a vehicle start switch being off. With this control, it is possible to control power supply from the high-voltage battery to the low-voltage system at a timing desired by the user. Hereinafter, embodiments of the present disclosure will be described in detail with reference to the drawings.

EMBODIMENTS

Configuration

Figure 1:
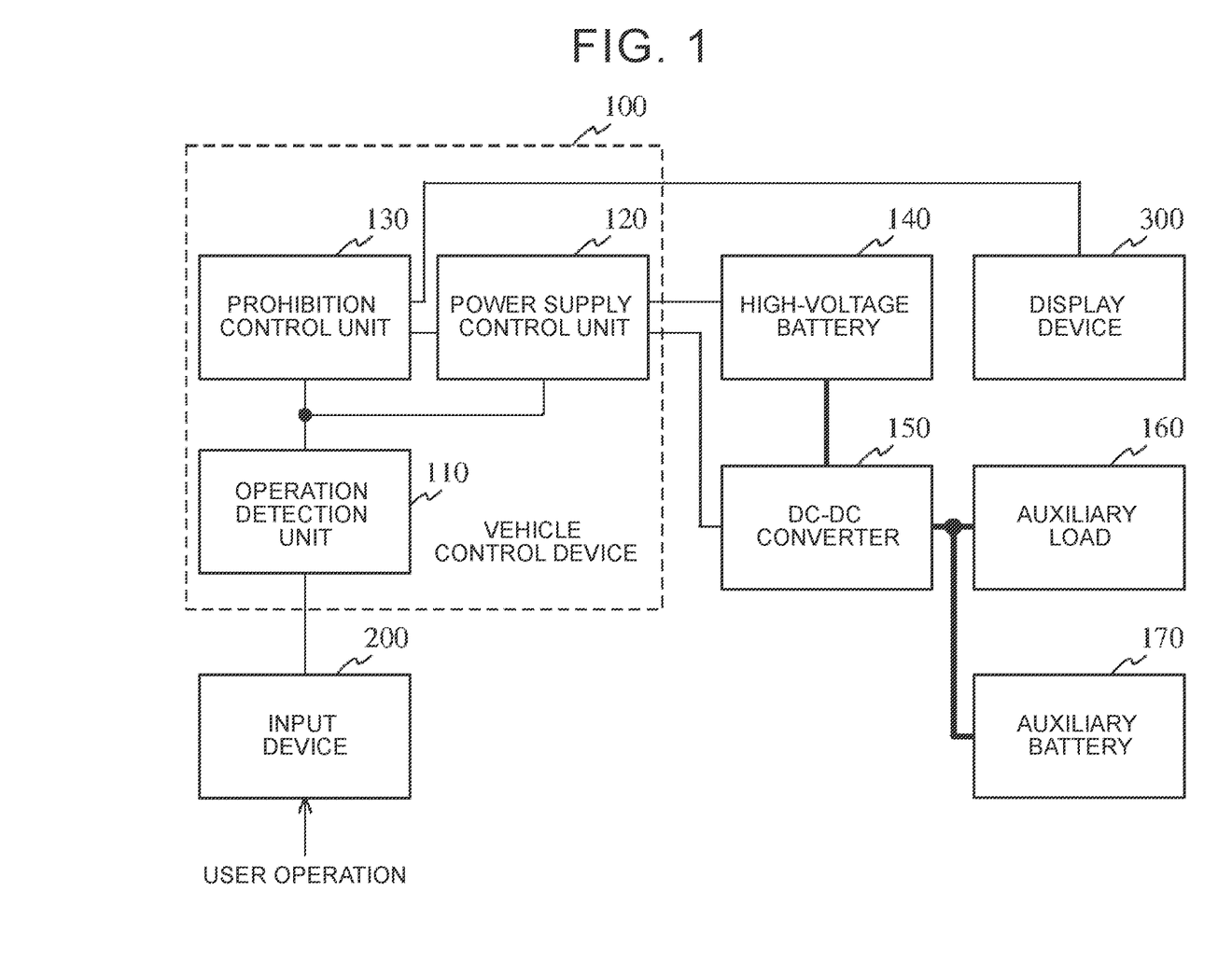
FIG. 1 is a functional block diagram of a vehicle control device and its peripheral components according to an embodiment.

FIG. 1 is a functional block diagram of a vehicle control device 100 and its peripheral components according to an embodiment of the present disclosure. The functional blocks illustrated in FIG. 1 include: a vehicle control device 100 including an operation detection unit 110, a power supply control unit 120, and a prohibition control unit 130; a high-voltage battery 140; a direct current-direct current (DC-DC) converter 150; an auxiliary load 160; an auxiliary battery 170; an input device 200; and a display device 300. The high-voltage battery 140, the DC-DC converter 150, the auxiliary load 160, and the auxiliary battery 170 are connected by power lines (thick lines in FIG. 1), and other components are connected by signal lines or communication lines (thin lines in FIG. 1).

The input device 200 is a device for receiving an input of an operation performed on the vehicle by a user such as a driver or a passenger of the vehicle. Examples of the input device 200 include: courtesy switch buttons installed on center pillars, etc. to detect the open/closed state of vehicle doors; touch sensors and electronic key push buttons installed on door handles to lock/unlock the vehicle doors; and a start switch button (start-and-stop push button) installed on the instrument panel, etc. to start/stop the vehicle operation.

The high-voltage battery 140 is a high-voltage secondary battery such as a lithium ion battery that can be charged and discharged, and is a battery (first battery) that is related to traveling of the vehicle and that supplies electric power to a high-voltage system including a so-called main device (not shown) such as an electric traction motor, for example. Further, the high-voltage battery 140 is connected to the auxiliary load 160 and the auxiliary battery 170 via the DC-DC converter 150, and the high-voltage battery 140 is configured to be able to supply electric power stored therein to the auxiliary load 160 and the auxiliary battery 170 in accordance with the control of the vehicle control device 100.

The DC-DC converter 150 connects the high-voltage battery 140, the auxiliary load 160, and the auxiliary battery 170, and can supply electric power stored in the high-voltage battery 140 to the auxiliary load 160 and the auxiliary battery 170. For the power supply, the DC-DC converter 150 can convert (lower) a high voltage of the high-voltage battery 140, which is an input voltage, into a prescribed low voltage and output the low voltage to the auxiliary battery 170 based on the control by the vehicle control device 100.

The auxiliary load 160 is a so-called auxiliary device mounted on the vehicle, and is a load that consumes the electric power necessary for performing a predetermined operation. The auxiliary load 160 operates with electric power supplied from the DC-DC converter 150 or electric power stored in the auxiliary battery 170. Although FIG. 1 shows only one auxiliary load 160, two or more auxiliary loads 160 may be mounted on the vehicle.

The auxiliary battery 170 is a rechargeable secondary battery such as a lead storage battery or a lithium ion battery, and is a battery (second battery) that serves as a power source for supplying power to the low-voltage system including the auxiliary load 160. Generally, the auxiliary battery 170 is set to have a lower rated voltage than the high-voltage battery 140.

The vehicle control device 100 can perform power control of the high-voltage system including the high-voltage battery 140 and power control of the low-voltage system including the auxiliary load 160 and the auxiliary battery 170. Further, the vehicle control device 100 of the present embodiment appropriately controls the power supply from the high-voltage battery 140 to the auxiliary load 160 and the auxiliary battery 170 of the low-voltage system (hereinafter referred to as "auxiliary load 160 and the like"), with the vehicle start switch being off. The vehicle control device 100 includes the operation detection unit 110, the power supply control unit 120, and the prohibition control unit 130. The vehicle control device 100 may be composed of one device or two or more devices.

The operation detection unit 110 is configured to detect a specific operation among the operations performed on the input device 200 by the user. Specific examples thereof include a series of door operations of opening and then closing the vehicle door, a start switch button pressing operation, and a vehicle door locking operation. Regarding the start switch button pressing operation, the operation detection unit 110 can detect the operation while identifying the situation where the button is operated (normal single press, long press for a predetermined time or longer, repeated press for a predetermined number of times or more, and press with the brake pedal depressed). The operation detection unit 110 notifies the power supply control unit 120 and the prohibition control unit 130 of the detected user operation.

The power supply control unit 120 executes power supply from the high-voltage battery 140 to the auxiliary load 160 and the like based on the notification from the operation detection unit 110. More specifically, when the power supply control unit 120 is notified of a series of door operations of opening and then closing the vehicle door while the vehicle start switch is off (vehicle operation is stopped), the power supply control unit 120 performs the power supply from the high-voltage battery 140 to the auxiliary load 160 and the like. As an example, the power supply ends when a predetermined amount of power is supplied to the auxiliary load 160 and the like or when the power supply to the auxiliary load 160 and the like is performed for a predetermined time.

Further, the power supply control unit 120 prohibits the power supply from the high-voltage battery 140 to the auxiliary load 160 and the like based on a prohibition request issued by the prohibition control unit 130 described later. Specifically, when the power supply from the high-voltage battery 140 to the auxiliary load 160 and the like is being performed, the power supply control unit 120 stops the power supply being performed. When the power supply from the high-voltage battery 140 to the auxiliary load 160 and the like is not being performed, the power supply control unit 120 performs control such that power supply is not newly started after receiving the prohibition request. Further, when a prohibition lifting request is issued by the prohibition control unit 130 after the power supply from the high-voltage battery 140 to the auxiliary load 160 and the like is prohibited based on the prohibition request, the power supply control unit 120 lifts the prohibition of the power supply from the high-voltage battery 140 to the auxiliary load 160 and the like. Thus, the power supply control unit 120 can perform the power supply from the high-voltage battery 140 to the auxiliary load 160 and the like.

Based on the notification from the operation detection unit 110, the prohibition control unit 130 makes a request for prohibiting the power supply from the high-voltage battery 140 to the auxiliary load 160 and the like and a request for lifting the prohibition, to the power supply control unit 120. More specifically, the prohibition control unit 130 issues, to the power supply control unit 120, a request for prohibiting the power supply from the high-voltage battery 140 to the auxiliary load 160 and the like, when a predetermined prohibition operation (first operation) is performed on the start switch button. Examples of the prohibition operation include long press for a predetermined time or longer and repeated press for a predetermined number of times or more of the start switch button. The prohibition control unit 130 issues, to the power supply control unit 120, a request for lifting the prohibition of the power supply from the high-voltage battery 140 to the auxiliary load 160 and the like (prohibition lifting request), when a predetermined prohibition lifting operation (second operation) is performed on the start switch button. Examples of the prohibition lifting operation include an operation of enabling the vehicle to travel, which is performed after the prohibition request is issued, that is, an operation of pressing the start switch button while the brake pedal is depressed.

Further, the prohibition control unit 130 requests the display device 300 to display the status of power supply from the high-voltage battery 140 to the auxiliary load 160 and the like in accordance with the instructions of the prohibition request and the prohibition lifting request to the power supply control unit 120 (status display request). The display content required of the display device 300 will be described later.

The display device 300 is a display device capable of displaying the status of power supply from the high-voltage battery 140 to the auxiliary load 160 and the like based on the status display request issued by the prohibition control unit 130. As the display device 300, for example, a multi-information display (MID), a head-up display (HUD), a center display, or the like can be used.

A part or all of the vehicle control device 100 described above may be composed of an electronic control unit (ECU) typically including a processor, a memory, an input/output interface, and the like. The electronic control unit realizes a function of controlling execution of the power supply from the high-voltage battery 140 to the auxiliary battery 170 by reading and executing, with the processor, the program stored in the memory.

Control

Figure 2:
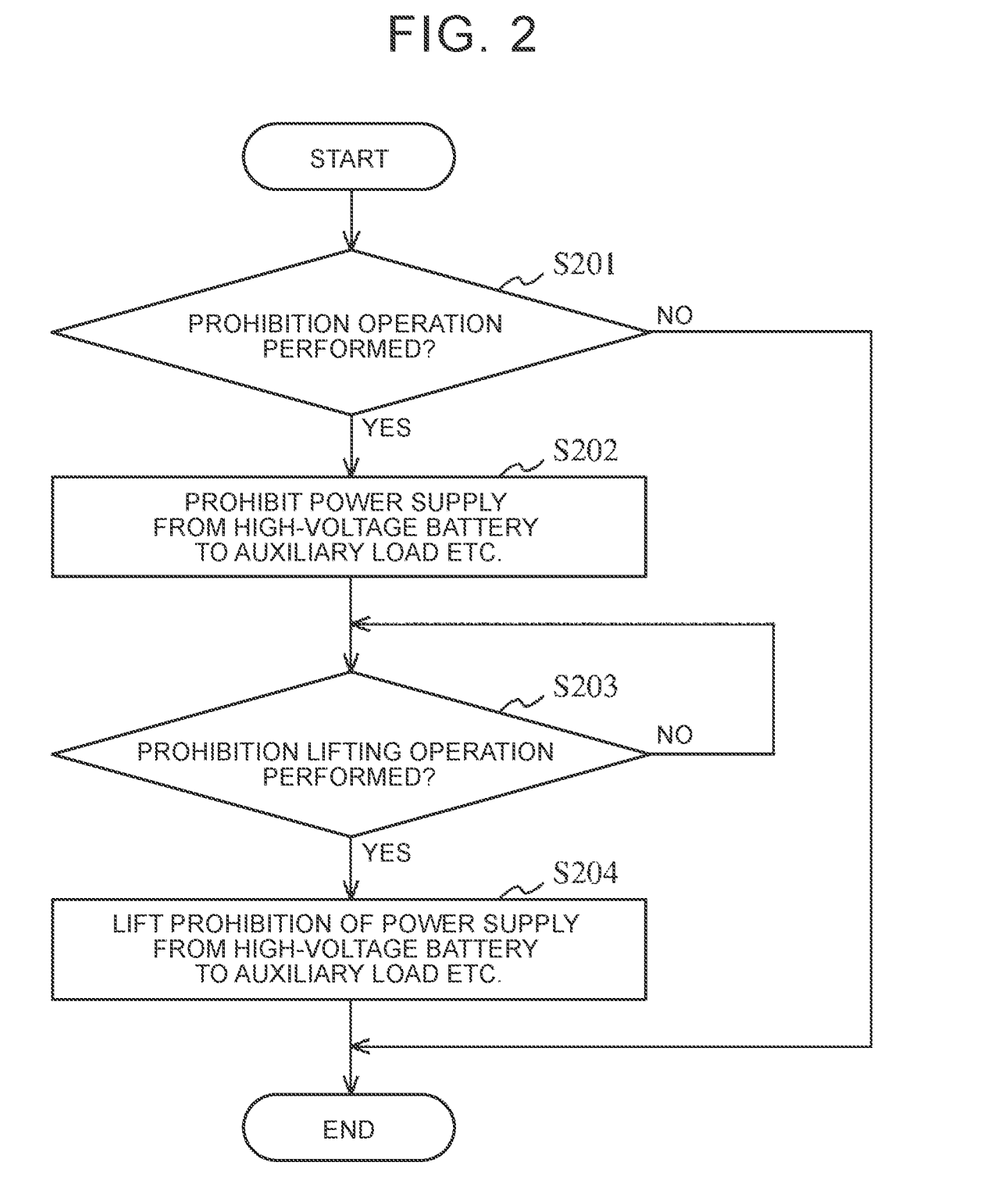
FIG. 2 is a flowchart showing a processing procedure of power supply control executed by the vehicle control device.

With reference to FIG. 2, control executed by the vehicle control device 100 according to the embodiment of the present disclosure will be described. FIG. 2 is a flowchart showing a processing procedure of controlling the power supply from the high-voltage battery 140 to the auxiliary load 160 and the like.

The power supply control shown in FIG. 2 is executed while the vehicle start switch is off.

Step S201

The operation detection unit 110 determines whether the operation detection unit 110 has detected that the user has performed the prohibition operation on the input device 200, that is, whether there has been the prohibition operation. The prohibition operation is a prescribed operation that the user has understood in advance as an operation of prohibiting the power supply from the high-voltage battery 140 to the auxiliary load 160 and the like. As the prohibition operation, long press of the start switch button for a predetermined time or longer and repeated press of the start switch button for a predetermined number of times or more can be defined. When the operation detection unit 110 determines that there has been the prohibition operation (step S201, yes), the prohibition control unit 130 is notified that there has been the prohibition operation, and the process proceeds to step S202; otherwise (step S201, no), the power supply control ends.

Step S202

The prohibition control unit 130 issues, to the power supply control unit 120, the request for prohibiting the power supply from the high-voltage battery 140 to the auxiliary load 160 and the like based on the notification that there has been the prohibition operation input from the operation detection unit 110. Further, the power supply control unit 120 prohibits the power supply from the high-voltage battery 140 to the auxiliary load 160 and the like based on the prohibition request issued by the prohibition control unit 130 described later. When the power supply is prohibited, the process proceeds to step S203.

Step S203

The operation detection unit 110 determines whether the operation detection unit 110 has detected that the user has performed the prohibition lifting operation on the input device 200, that is, whether there has been the prohibition lifting operation. The prohibition lifting operation is a prescribed operation that the user has understood in advance as an operation of lifting the prohibition of power supply from the high-voltage battery 140 to the auxiliary load 160 and the like. As the prohibition lifting operation, pressing the start switch button while the brake pedal is depressed can be defined. When the operation detection unit 110 determines that there has been the prohibition lifting operation (step S203, yes), the prohibition control unit 130 is notified that there has been the prohibition lifting operation, and the process proceeds to step S204; otherwise (step S203, no), the determination of step S203 is repeated.

Step S204

The prohibition control unit 130 issues, to the power supply control unit 120, the request for lifting the prohibition of the power supply from the high-voltage battery 140 to the auxiliary load 160 and the like based on the notification that there has been the prohibition lifting operation input from the operation detection unit 110. Further, the power supply control unit 120 lifts the prohibition of the power supply from the high-voltage battery 140 to the auxiliary load 160 and the like based on the prohibition lifting request issued by the prohibition control unit 130 described later. When the prohibition of power supply is lifted, the power supply control ends.

Thus, according to the power supply control of the present embodiment, when the power supply from the high-voltage battery 140 to the auxiliary load 160 and the like is being performed, the power supply from the high-voltage battery 140 to the auxiliary load 160 and the like can be interrupted at a timing desired by the user. Further, the power supply from the high-voltage battery 140 to the auxiliary load 160 and the like can be restored (restarted) at a timing desired by the user.

Example of Display Screen Based on Control

With further reference to FIGS. 3 to 8, an example of a display screen showing the power supply status, which is displayed on the display device 300 in accordance with the power supply control by the vehicle control device 100, will be described.

(1) First Example

Figure 3:
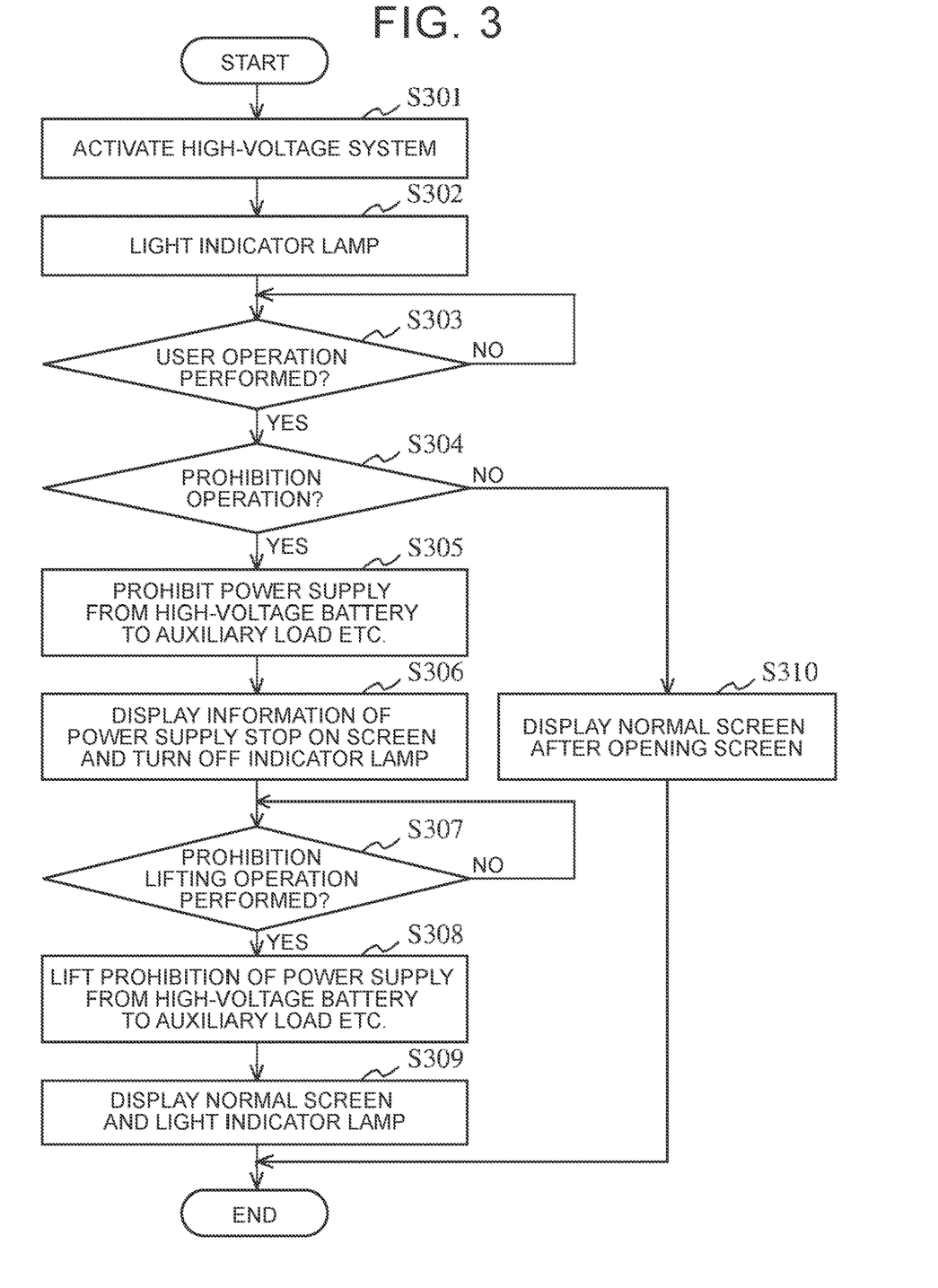
FIG. 3 is a flowchart showing a processing procedure of power supply control and screen display control (first example)
Figure 4:
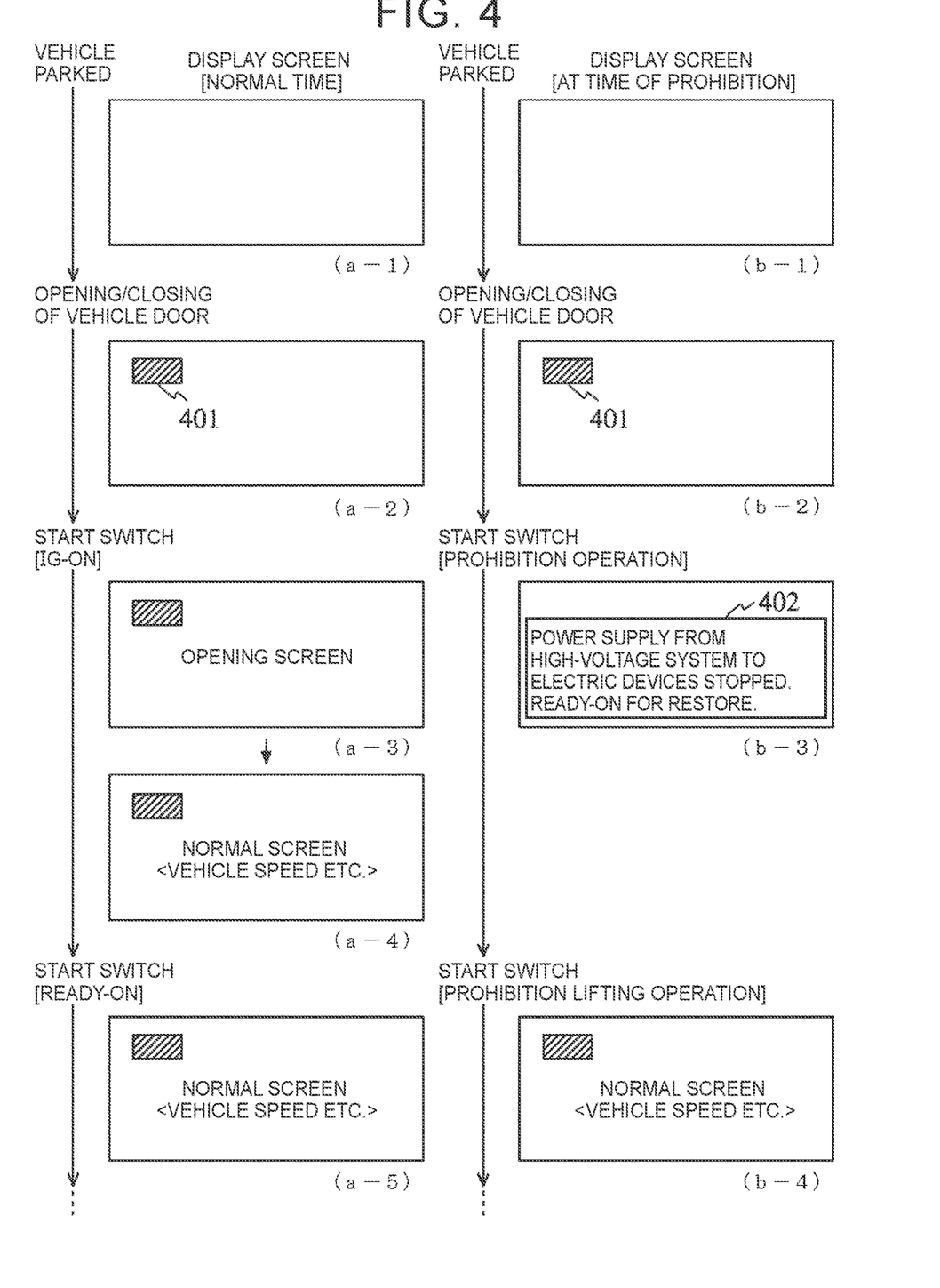
FIG. 4 is an example of a display screen of a display device at a time of activation based on the first example.

FIG. 3 is a flowchart showing a processing procedure in which a first example of the screen display control by the display device 300 is incorporated in the power supply control by the vehicle control device 100. FIG. 4 is a diagram illustrating an example of the display screen of the display device 300 when the vehicle transitions from a parked state to a runnable state (at the time of boarding) according to the processing procedure of FIG. 3. In FIG. 4, screens on the left side (a-1 to a-5) are examples of the display screen of the related art when the prohibition operation (prohibition lifting operation) is not performed, and screens on the right side (b-1 to b-4) are examples of the display screen of the present embodiment when the prohibition operation and the prohibition lifting operation are performed.

The control shown in FIG. 3 is started, when a series of door operations of opening and then closing the vehicle door is performed with the vehicle start switch being off, such as when the vehicle is parked. Nothing is displayed on the screen of the display device 300 until the control is started (a-1, b-1 in FIG. 4).

Step S301

The vehicle control device 100 activates the high-voltage system based on the series of door operations of the vehicle door detected by the operation detection unit 110. When the high-voltage system is activated, the process proceeds to step S302.

Step S302

The display device 300 lights (displays) an indicator lamp 401 indicating that the high-voltage system is active on the screen, in response to the activation of the high-voltage system (a-2 and b-2 in FIG. 4). The mode (shape, size, color, etc.) of the indicator lamp 401 is not particularly limited. The indicator lamp 401 is always lit (displayed) while the high-voltage system is active. When the indicator lamp 401 is lit (displayed) on the screen of the display device 300, the process proceeds to step S303.

Step S303

The vehicle control device 100 determines whether there has been a user operation on the input device 200. When there has been the user operation (step S303, yes), the process proceeds to step S304; otherwise (step S303, no), the process of step S303 is repeated. When there is no user operation even after a predetermined time has elapsed, the control at the time of boarding according to the first example may be terminated.

Step S304

The vehicle control device 100 determines whether the user operation is the prohibition operation. The prohibition operation is as described above. When the user operation is the prohibition operation (step S304, yes), the process proceeds to step S305; otherwise (step S304, no), the process proceeds to step S310.

Step S305

The vehicle control device 100 controls the DC-DC converter 150 to prohibit the power supply from the high-voltage battery 140 to the auxiliary load 160 and the like. As a result, the processing of power supply from the high-voltage battery 140 to the auxiliary load 160 and the like is stopped. When the power supply is stopped, the process proceeds to step S306.

Step S306

The display device 300 displays text information 402 that notifies the user that the power supply has been stopped on the screen, and turns off (hides) the indicator lamp 401 from the screen (b-3 in FIG. 4). The mode (text, decorative frame, etc.) of the text information 402 is not particularly limited. When the text information 402 is displayed on the screen and the indicator lamp 401 is turned off from the screen, the process proceeds to step S307.

Step S307

The vehicle control device 100 determines whether there has been the prohibition lifting operation on the input device 200. The prohibition lifting operation is as described above. When there has been the prohibition lifting operation (step S307, yes), the process proceeds to step S308; otherwise (step S307, no), the process of step S307 is repeated.

Step S308

The vehicle control device 100 controls the DC-DC converter 150 to lift the prohibition of the power supply from the high-voltage battery 140 to the auxiliary load 160 and the like. As a result, the processing of power supply from the high-voltage battery 140 to the auxiliary load 160 and the like is restored (restarted). When the power supply is started, the process proceeds to step S309.

Step S309

The display device 300 displays a normal screen including vehicle speed information and the like, and lights (displays) the indicator lamp 401 on the screen (b-4 in FIG. 4). Thus, the control at the time of boarding according to the first example is completed.

Step S310

The display device 300 displays an opening screen for only a first period (a-3 in FIG. 4), and then subsequently displays the normal screen including the vehicle speed information and the like (a-4 in FIG. 4). The first period is determined based on, for example, a time required for self-checking at the time of activation. Even when the start switch is turned on by the user operation afterwards, the same screen is displayed (a-5 in FIG. 4). Thus, the control at the time of boarding according to the first example is completed.

Figure 5:
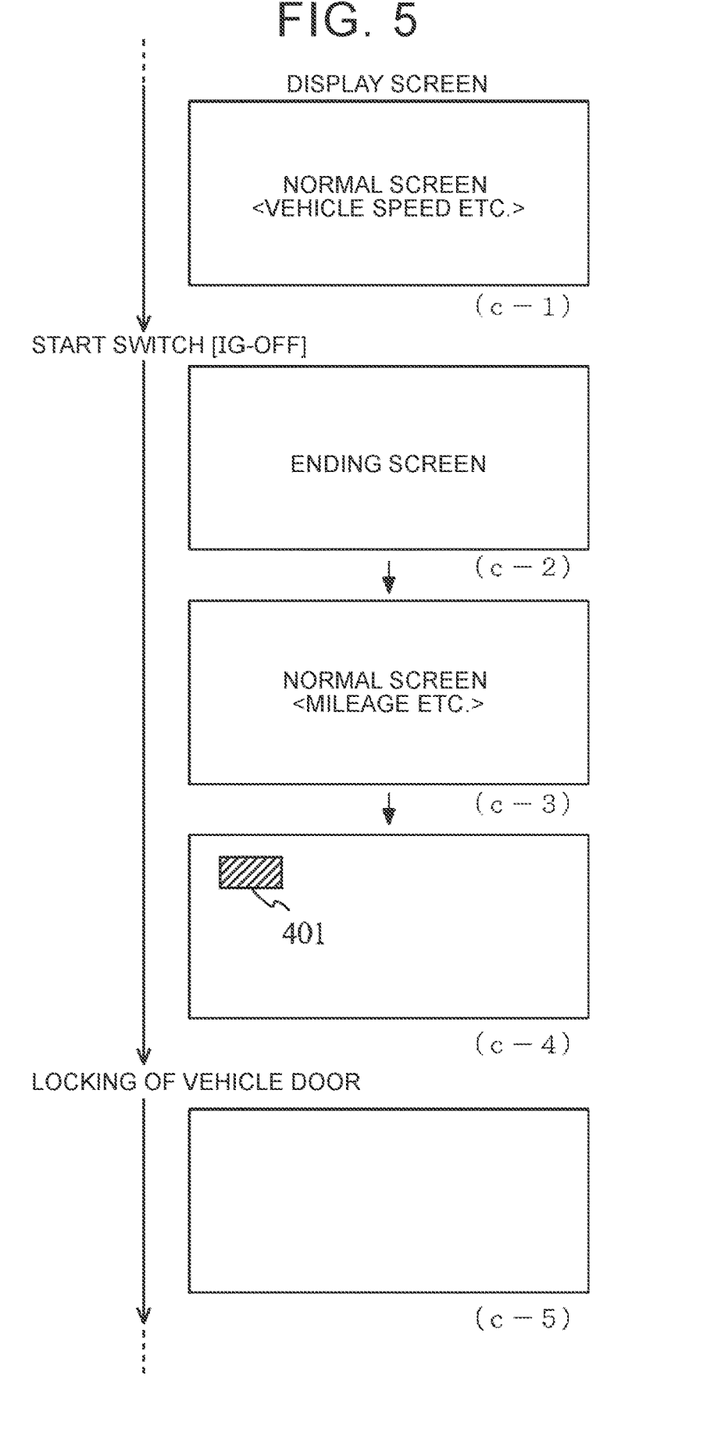
FIG. 5 is an example of a display screen of the display device at a time of ending based on the first example.

FIG. 5 is a diagram illustrating an example of the display screen according to the first example of the display device 300 when the vehicle transitions from the runnable state to the parked state (at the time of alighting).

When the start switch is on, the display device 300 displays the normal screen including the vehicle speed information and the like (c-1 in FIG. 5). When the start switch button is pressed in this state to turn off the start switch, the display device 300 displays an ending screen for only a second period (c-2 in FIG. 5), and then subsequently displays the normal screen including mileage information and the like only for a third period (c-3 in FIG. 5). The second period and third period are determined based on, for example, a time required for self-checking at the time of ending. When display of the ending screen and the normal screen is completed, the display device 300 lights (displays) the indicator lamp 401 on the screen with the activation of the high-voltage system by the vehicle control device 100 (c-4 in FIG. 5). The activation of the high-voltage system continues until the user gets off the vehicle and locks the vehicle door. Then, when the user gets off the vehicle and the vehicle door is locked, the indicator lamp 401 is turned off and nothing is displayed on the screen of the display device 300 (c-5 in FIG. 5). As a result, the screen display control at the time of alighting according to the first example is completed.

The input of the prohibition operation by the user may be determined while the vehicle is transitioned from the runnable state to the parked state. When there has been the prohibition operation, it is possible to stop the activation of the high-voltage system or prohibit the power supply from the high-voltage battery 140 to the auxiliary load 160 and the like after the display of the normal screen is finished.

(2) Second Example

Figure 6:
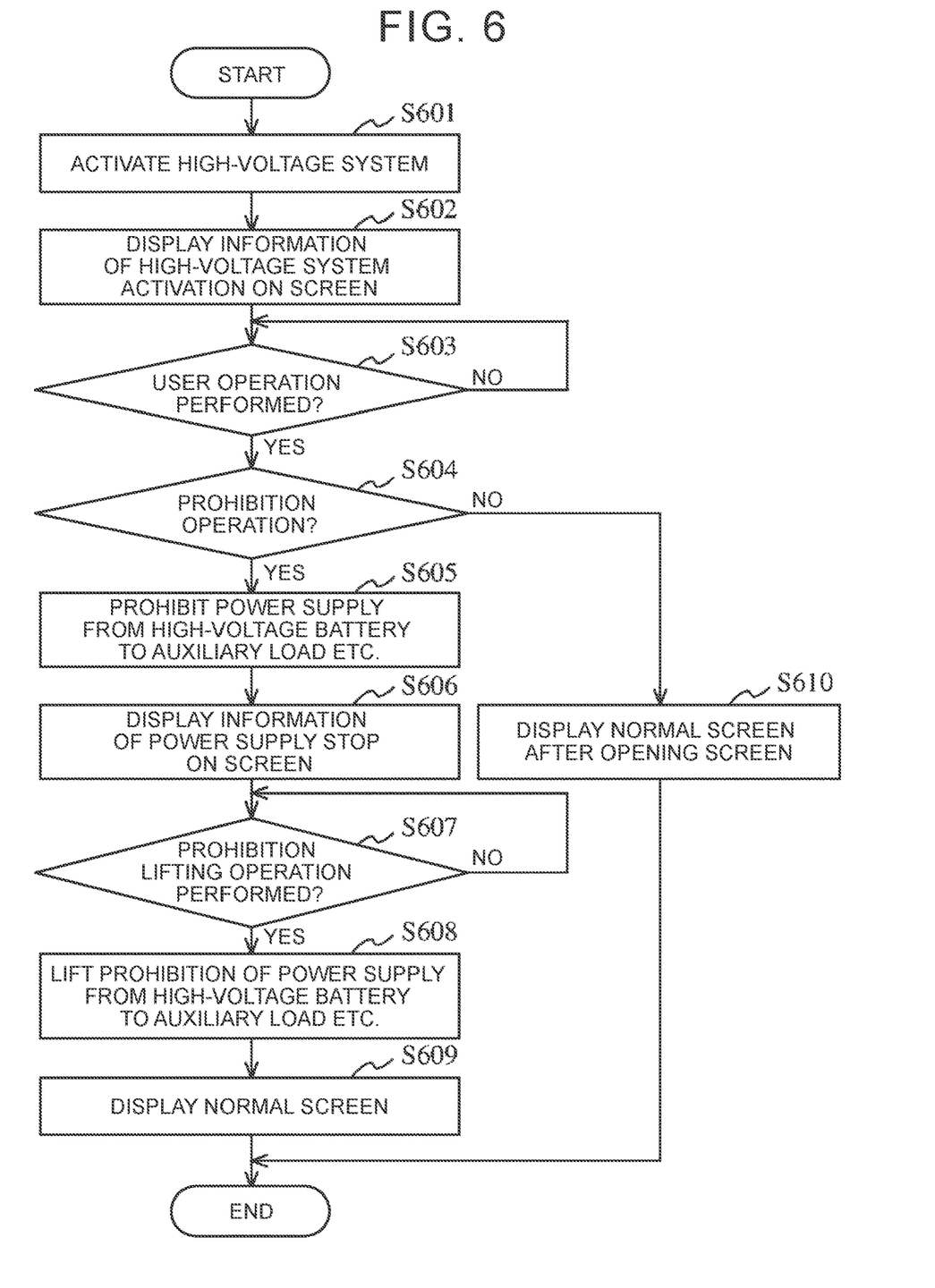
FIG. 6 is a flowchart showing a processing procedure of power supply control and screen display control (second example)
Figure 7:
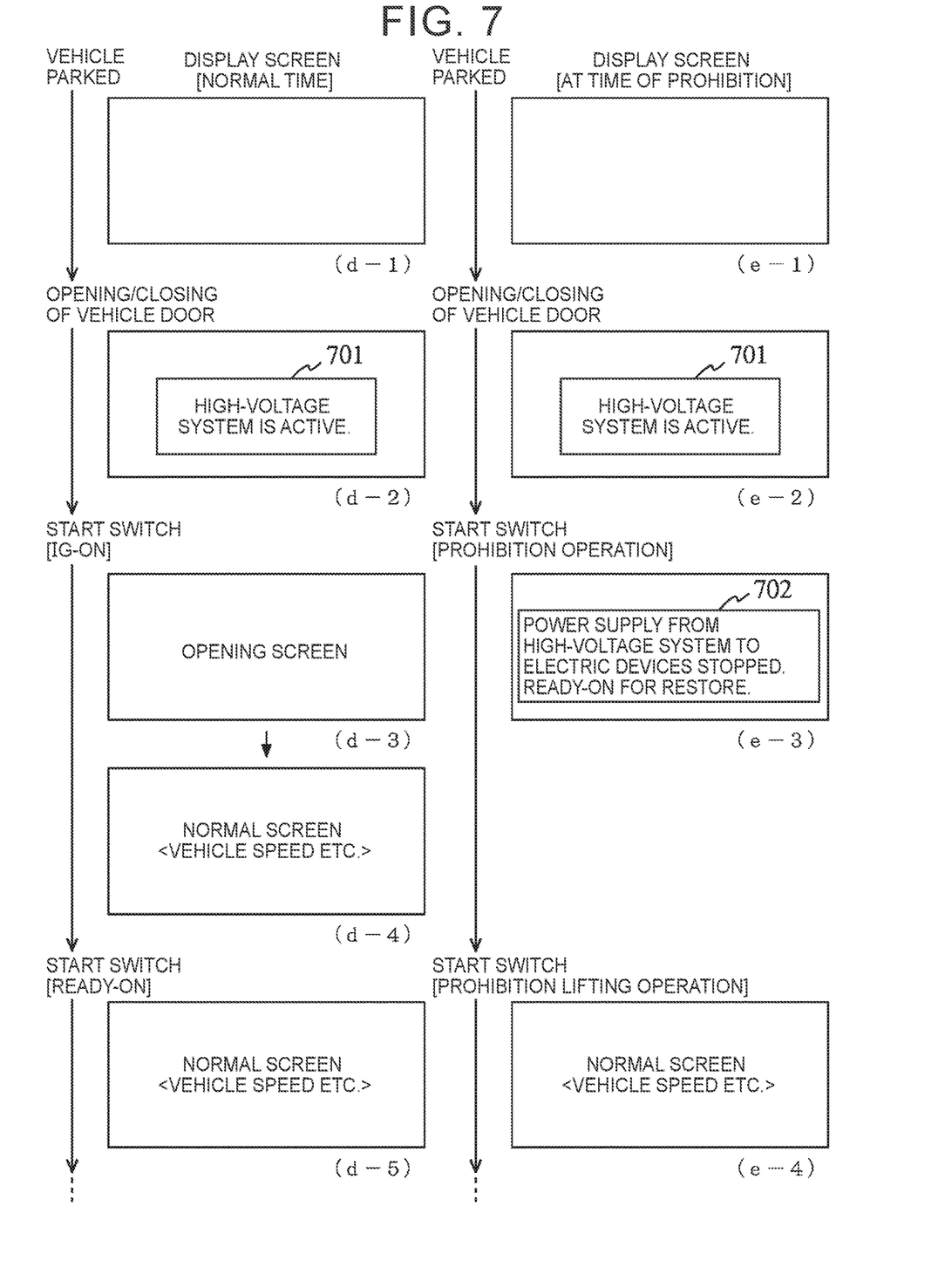
FIG. 7 is an example of a display screen of the display device at a time of activation based on the second example.

FIG. 6 is a flowchart showing a processing procedure in which a second example of the screen display control by the display device 300 is incorporated in the power supply control by the vehicle control device 100. FIG. 7 is a diagram illustrating an example of the display screen of the display device 300 when the vehicle transitions from a parked state to a runnable state (at the time of boarding) according to the processing procedure of FIG. 6. In FIG. 7, screens on the left side (d-1 to d-5) are examples of the display screen of the related art when the prohibition operation (prohibition lifting operation) is not performed, and screens on the right side (e-1 to e-4) are examples of the display screen of the present embodiment when the prohibition operation and the prohibition lifting operation are performed.

The control shown in FIG. 6 is started, when a series of door operations of opening and then closing the vehicle door is performed with the vehicle start switch being off, such as when the vehicle is parked. Nothing is displayed on the screen of the display device 300 until the control is started (d-1, e-1 in FIG. 7).

Step S601

The vehicle control device 100 activates the high-voltage system based on the series of door operations of the vehicle door detected by the operation detection unit 110. When the high-voltage system is activated, the process proceeds to step S602.

Step S602

The display device 300 displays text information 701 indicating that the high-voltage system is active on the screen, in response to the activation of the high-voltage system (d-2 and e-2 in FIG. 7). The mode (text, decorative frame, etc.) of the text information 701 is not particularly limited. The text information 701 is always displayed while the high-voltage system is active. When the text information 701 is displayed on the screen of the display device 300, the process proceeds to step S603.

Step S603

The vehicle control device 100 determines whether there has been a user operation on the input device 200. When there has been the user operation (step S603, yes), the process proceeds to step S604; otherwise (step S603, no), the process of step S603 is repeated. When there is no user operation even after a predetermined time has elapsed, the control at the time of boarding according to the second example may be terminated.

Step S604

The vehicle control device 100 determines whether the user operation is the prohibition operation. The prohibition operation is as described above. When the user operation is the prohibition operation (step S604, yes), the process proceeds to step S605; otherwise (step S604, no), the process proceeds to step S610.

Step S605

The vehicle control device 100 controls the DC-DC converter 150 to prohibit the power supply from the high-voltage battery 140 to the auxiliary load 160 and the like. As a result, the processing of power supply from the high-voltage battery 140 to the auxiliary load 160 and the like is stopped. When the power supply is stopped, the process proceeds to step S606.

Step S606

The display device 300 displays text information 702 that notifies the user that the power supply has been stopped on the screen (e-3 in FIG. 7). The mode (text, decorative frame, etc.) of the text information 702 is not particularly limited. When the text information 702 is displayed on the screen, the process proceeds to step S607.

Step S607

The vehicle control device 100 determines whether there has been the prohibition lifting operation on the input device 200. The prohibition lifting operation is as described above. When there has been the prohibition lifting operation (step S607, yes), the process proceeds to step S608; otherwise (step S607, no), the process of step S607 is repeated.

Step S608

The vehicle control device 100 controls the DC-DC converter 150 to lift the prohibition of the power supply from the high-voltage battery 140 to the auxiliary load 160 and the like. As a result, the processing of power supply from the high-voltage battery 140 to the auxiliary load 160 and the like is restored (restarted). When the power supply is started, the process proceeds to step S609.

Step S609

The display device 300 displays a normal screen including vehicle speed information and the like (e-4 in FIG. 7). Thus, the control at the time of boarding according to the second example is completed.

Step S610

The display device 300 displays an opening screen for only a first period (d-3 in FIG. 7), and then subsequently displays the normal screen including the vehicle speed information and the like (d-4 in FIG. 7). The first period is determined based on, for example, a time required for self-checking at the time of activation. Even when the start switch is turned on by the user operation afterwards, the same screen is displayed (d-5 in FIG. 7). Thus, the control at the time of boarding according to the second example is completed.

Figure 8:
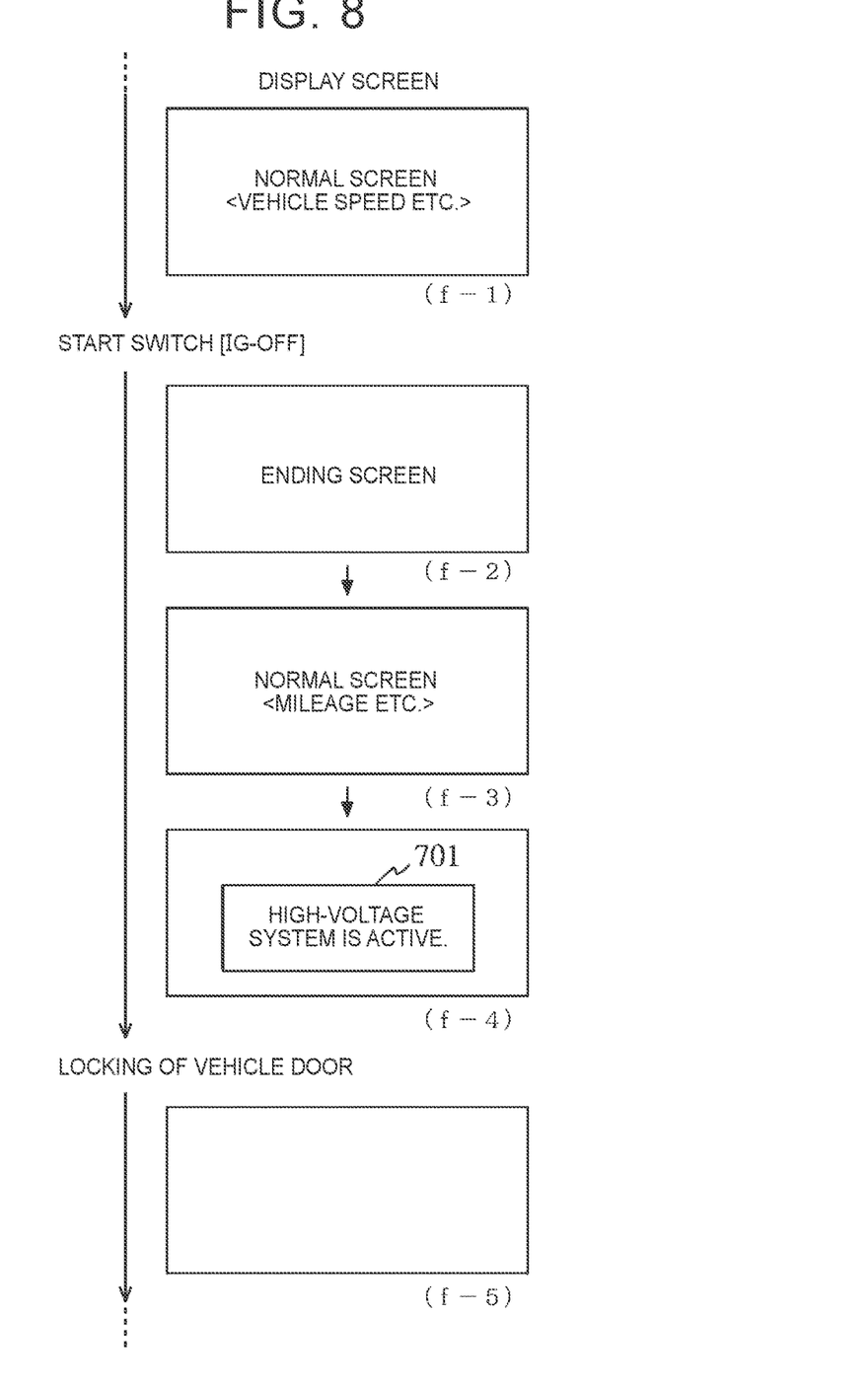
FIG. 8 is an example of a display screen of the display device at a time of ending based on the second example.

FIG. 8 is a diagram illustrating an example of the display screen according to the second example of the display device 300 when the vehicle transitions from the runnable state to the parked state (at the time of alighting).

When the start switch is on, the display device 300 displays the normal screen including the vehicle speed information and the like (f-1 in FIG. 8). When the start switch button is pressed in this state and the start switch is turned off, the display device 300 displays an ending screen for only a second period (f-2 in FIG. 8), and then subsequently displays the normal screen including mileage information and the like only for a third period (f-3 in FIG. 8). The second period and third period are determined based on, for example, a time required for self-checking at the time of ending. When display of the ending screen and the normal screen is completed, the display device 300 displays the text information 701 on the screen with the activation of the high-voltage system by the vehicle control device 100 (f-4 in FIG. 8). The activation of the high-voltage system continues until the user gets off the vehicle and locks the vehicle door. Then, when the user gets off the vehicle and the vehicle door is locked, the text information 701 disappears and nothing is displayed on the screen of the display device 300 (f-5 in FIG. 8). As a result, the screen display control at the time of alighting according to the second example is completed.

The input of the prohibition operation by the user may be determined while the vehicle is transitioned from the runnable state to the parked state. When there has been the prohibition operation, it is possible to stop the activation of the high-voltage system or prohibit the power supply from the high-voltage battery 140 to the auxiliary load 160 and the like after the display of the normal screen is finished.

Operations and Effects

As described above, when the vehicle start switch is off and the user performs the prohibition operation, the vehicle control device 100 according to the embodiment of the present disclosure prohibits the power supply from the high-voltage battery 140 to the auxiliary load 160 and the auxiliary battery 170 included in the low-voltage system. With this control, it is possible to interrupt the power supply from the high-voltage battery 140 to the low-voltage system at a timing desired by the user.

Further, when the user performs the prohibition lifting operation after the power supply from the high-voltage battery 140 to the auxiliary load 160 and the auxiliary battery 170 is prohibited, the vehicle control device 100 according to the present embodiment lifts the prohibition of power supply from the high-voltage battery 140 to the auxiliary load 160 and the auxiliary battery 170 included in the low-voltage system. With this control, it is possible to restore (restart) the power supply from the high-voltage battery 140 to the low-voltage system at a timing desired by the user.

Although the embodiment of the present disclosure has been described above, the present disclosure can be construed as a vehicle control device, a control method executed by the vehicle control device, a control program, a computer-readable non-transitory storage medium that stores the control program, or a vehicle including the vehicle control device.

The vehicle control device and the like of the present disclosure can be used in electrically-driven vehicles equipped with a high-voltage battery for vehicle traveling, such as hybrid vehicles (HVs), plug-in hybrid vehicles (PHVs), and electric vehicles (EVs).

What is claimed is:

1. A vehicle control device mounted on a vehicle, the vehicle control device comprising a processor configured to, while a start switch of the vehicle is off:
   detect a predetermined operation performed on the vehicle by a user, the predetermined operation being different from an operation for starting the vehicle;
   control execution of power supply from a high-voltage battery to an auxiliary load, the high-voltage battery being involved in vehicle traveling, and the auxiliary load being powered by an auxiliary battery of which a rated voltage is set to be lower than that of the high-voltage battery; and
   prohibit the power supply from the high-voltage battery to the auxiliary load in response to detecting the predetermined operation by the user.

2. The vehicle control device according to claim 1, wherein
   the predetermined operation includes a first operation and a second operation that are different from each other, and
   the processor is configured to, while the start switch is off,
      prohibit the power supply from the high-voltage battery to the auxiliary load in response to detecting the first operation, and
      lift prohibition of the power supply from the high-voltage battery to the auxiliary load in response to detecting the second operation in a state where the power supply from the high-voltage battery to the auxiliary load is prohibited.

3. The vehicle control device according to claim 2, wherein the first operation is an operation of pressing a button of the start switch for a predetermined time or longer, or an operation of repeatedly pressing the button of the start switch a predetermined number of times or more.

4. A control method that is executed by a computer of a vehicle control device mounted on a vehicle, the control method comprising:
   detecting, while a start switch of the vehicle is off, a predetermined operation performed on the vehicle by a user, the predetermined operation being different from an operation for starting the vehicle;
   controlling, while the start switch is off, execution of power supply from a high-voltage battery to an auxiliary load, the high-voltage battery being involved in vehicle traveling, and the auxiliary load being powered by an auxiliary battery of which a rated voltage is set to be lower than that of the high-voltage battery; and
   prohibiting, while the start switch is off, the power supply from the high-voltage battery to the auxiliary load in response to detecting the predetermined operation by the user.

5. A non-transitory storage medium storing a control program that is executed by a computer of a vehicle control device mounted on a vehicle and that causes the computer to execute functions comprising:
   detecting, while a start switch of the vehicle is off, a predetermined operation performed on the vehicle by a user, the predetermined operation being different from an operation for starting the vehicle;
   controlling, while the start switch is off, execution of power supply from a high-voltage battery to an auxiliary load, the high-voltage battery being involved in vehicle traveling, and the auxiliary load being powered by an auxiliary battery of which a rated voltage is set to be lower than that of the high-voltage battery; and
   prohibiting, while the start switch is off, the power supply from the high-voltage battery to the auxiliary load in response to detecting the predetermined operation by the user.

6. A vehicle equipped with the vehicle control device according to claim 1.

7. The vehicle control device according to claim 2, wherein
   the predetermined operation further includes a third operation different from the first operation and the second operation, and
   the processor is configured to, while the start switch is off,
      activate the execution of the power supply from the high-voltage battery to the auxiliary load in response to detecting the third operation,
      stop the execution of the power supply from the high-voltage battery to the auxiliary load in response to detecting the first operation while the execution of the power supply from the high-voltage battery to the auxiliary load is activated, and
      restart the execution of the power supply from the high-voltage battery to the auxiliary load in response to detecting the second operation after stopping the execution of the power supply from the high-voltage battery to the auxiliary load.

8. The vehicle control device according to claim 7, wherein the processor is configured to, after the first operation is detected and until the second operation is detected, not activate the power supply from the high-voltage battery to the auxiliary load even when the third operation is detected.

* * * * *